United States Patent [19]
Johansson

[11] 3,791,737
[45] Feb. 12, 1974

[54] SPECTROMETER IN WHICH A DESIRED NUMBER OF SPECTRAL LINES ARE FOCUSED AT ONE FIXED OUTPUT SLIT

[76] Inventor: Axel Bernhard Johansson, Klensmedsvagen 40, 37 Hagersten, Sweden

[22] Filed: June 16, 1972

[21] Appl. No.: 263,777

[30] Foreign Application Priority Data
June 8, 1971 Sweden.............................. 7945/71

[52] U.S. Cl.................. 356/79, 350/162 R, 356/99
[51] Int. Cl............................. G01j 3/40, G01j 3/12
[58] Field of Search..... 356/74, 79, 86, 89, 99, 100, 356/101, 187; 350/162 R

[56] References Cited
UNITED STATES PATENTS
3,523,734 8/1970 Brehm et al. .................... 350/162 R
3,567,322 3/1971 Brehm et al. .................... 350/162 R
3,664,741 5/1972 Bonnet et al..................... 350/162 R Primary Examiner—Ronald L. Wibert
Assistant Examiner—V. P. McGraw

[57] ABSTRACT

A spectrometer where spectral lines within a wide wavelength range with a high resolution can be focused at one fixed output slit by using a diffraction grating which consists of separate areas having different numbers of grooves per unit length, the grating being arranged to refract spectral lines in superimposition or in alignment with each other, the instrument being suitable for flame photometer determination of substances.

3 Claims, 2 Drawing Figures

SPECTROMETER IN WHICH A DESIRED NUMBER OF SPECTRAL LINES ARE FOCUSED AT ONE FIXED OUTPUT SLIT

Therefore, the invention consists in the provision of a spectrometer having a diffraction grating in which different areas of the grating have different constants, or numbers of grooves per unit length, the different areas being disposed so that the grooves are aligned generally in parallel side-by-side relationship, rather than end-to-end whereby a narrow angle source of light will impinge on all of the areas and the difficulties of obtaining an even distribution of light over a wide angle is eliminated.

Figure 1:
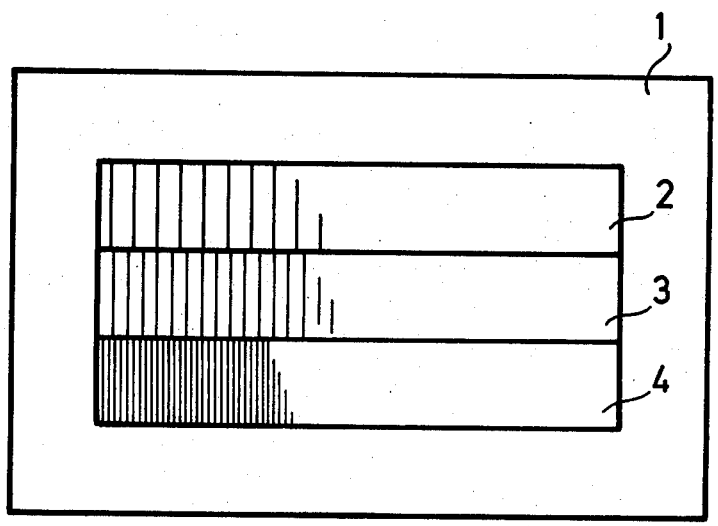
Figure 2:
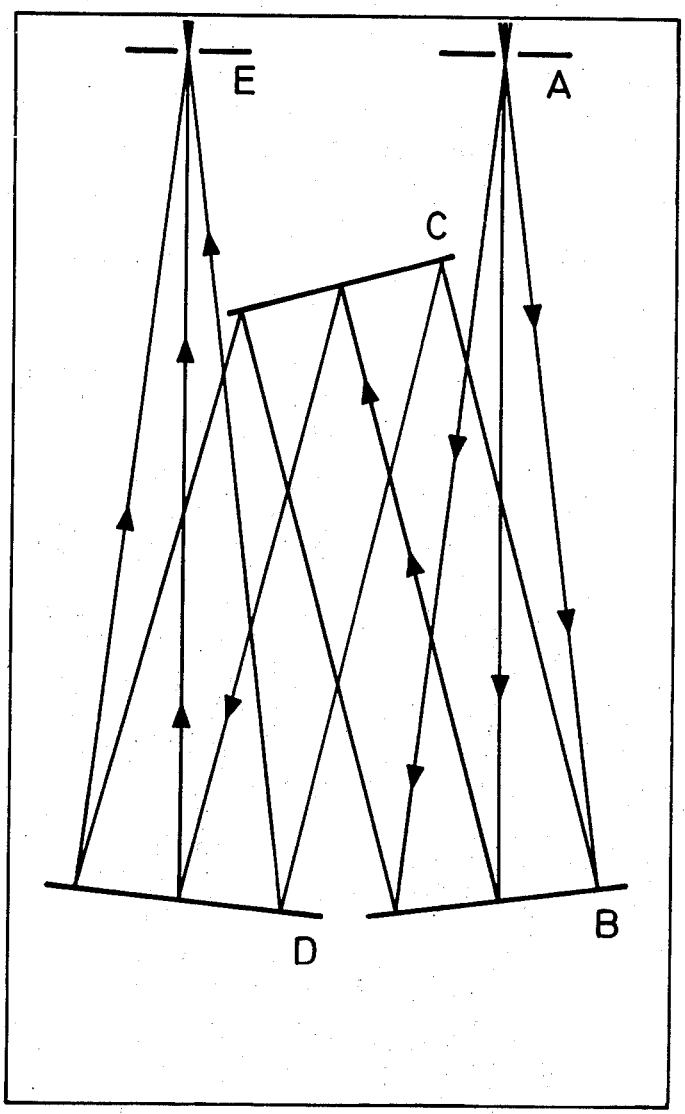

The invention will now be described in detail, reference being made to the enclosed drawings in which:

FIG. 1 shows a preferred embodiment of a grating to be used in the spectrometer according to the invention, and FIG. 2 schematically shows the light path in a spectrometer according to the invention, using a grating designed in accordance with FIG. 1.

In the spectrometer according to the invention light is diffracted by several gratings having different grating constants, i.e., number of grooves per millimeter, the gratings being arranged on the top of each other, i.e., in a direction parallel to the grooves. The grating constants of the different gratings are chosen so as to focus spectral lines of predetermined wavelengths at a common fixed output slit by using a common optical unit between the gratings and the slit.

In the grating unit according to FIG. 1, three different gratings denoted 2, 3, and 4 are arranged on an integral substrate 1, the different gratings being parallel to each other which implies that if the gratings are exposed to white light, three complete parallel spectra will be obtained. These spectra will then because of the different grating constants be laterally displaced which means that different parts of the total spectrum can be focused at one common output slit.

In FIG. 2 there is shown schematically a spectrometer according to the invention where the configuration of the different parts is known per se. Reference A denotes an input slit from which light incides towards a spherical mirror B. This mirror is arranged so as to reflect a parallel beam towards a grating C. Light impinging the grating will be split up into spectral components, which are focused by a mirror D towards an output slit E. If the grating C is designed in accordance with FIG. 1, i.e., the grating consists of several gratings having different grating constants, the mirror D will focus a number of spectra at the output slip E. Depending on the shape of the mirror D the different spectra are either focused at the same or at different vertical levels.

If different spectra are focused on different levels, a complete spectrum covering a very extensive wavelength range could be recorded as partial spectra located on the top of each other. Thus, e.g., an iron spectrum, divided into 1 partial spectra, could be recorded on a film having the dimensions of 24 × 35 mm with the same resolution as if it had been recorded on a 350 mm long film, which would have been very unpractical to handle.

If instead different spectra are focused at the same level, other advantages are obtained. By chosing suitable grating contants of the gratings it is, e.g., possible at flame-photometrical analysis to have the characteristic wavelengths of a number of different substances focused at a common detector, e.g., a photomultiplier at the output slit, The different spectral lines could thereby be separated by a sequential shielding of all gratings except one. It is also possible to separate the spectral lines by using suitable filters at the output slit.

The invention could of course be modified in different ways within the scope of the claims. Thus the gratings must not necessarily be located in parallel above each other in the same plane as shown in FIG. 1, but could be situated on the top of each other on a curved surface in which case the gratings could be self-focusing and the mirror D eliminated. Furthermore, the grating unit might consist of transmitting instead of reflecting gratings.

I claim:

1. Spectrometer in which a desired number of partial spectra can be focused at one single fixed output slit, characterized in that it comprises a grating unit consisting of a number of separate gratings located in alignment with each other in a direction parallel to the grooves of the gratings, an input slit, means for directing light from said input slit towards said grating unit, a fixed output slit and means for focusing light split up by said grating unit on said output slit, the grating constants of the different gratings being chosen so as to focus predetermined wavelength ranges at said output slit.

2. Spectrometer according to claim 1, characterized in said said grating unit consists of a plane integral substrate provided with said gratings.

3. spectrometer according to claim 1, characterized inthat the optical unit is designed so as to focus in that partial spectra at a common point at the exit slit.

* * * * *

UNITED STATES PATENT OFFICE
CERTIFICATE OF CORRECTION

Patent No. 3,791,737          Dated    February 12, 1974

Inventor(s)    Axel Bernhard Johansson

It is certified that error appears in the above-identified patent and that said Letters Patent are hereby corrected as shown below:

On the title page [76] "Klensmedsvagen 40, 37 Hagersten, Sweden" should read -- Klensmedsvagen 40, 126 37 Hagersten, Sweden --; [30] "June 8, 1971" should read -- June 18, 1971 --.

Signed and sealed this 3rd day of December 1974.

(SEAL)
Attest:

McCOY M. GIBSON JR.          C. MARSHALL DANN
Attesting Officer            Commissioner of Patents